(12) United States Patent
Holley

(10) Patent No.: US 6,843,022 B1
(45) Date of Patent: Jan. 18, 2005

(54) SELF-WATERING PLANT CARRYING APPARATUS

(76) Inventor: Clarence W. Holley, P.O. Box 84 402 Ellis St., Wren, GA (US) 30833

( * ) Notice: Subject to any disclaimer, the term of this patent is extended or adjusted under 35 U.S.C. 154(b) by 0 days.

(21) Appl. No.: 10/705,142

(22) Filed: Nov. 10, 2003

(51) Int. Cl.[7] .......................... A01G 9/02; A01G 25/02; A47G 7/04
(52) U.S. Cl. ................................ 47/67; 47/48.5; 47/39
(58) Field of Search ................................ 47/67, 79, 82, 47/48.5, 39; D11/148; 211/85.23

(56) References Cited

U.S. PATENT DOCUMENTS

| 217,010 | A | | 7/1879 | Judson et al. | |
|---|---|---|---|---|---|
| 577,230 | A | | 2/1897 | Boyd | |
| 2,654,346 | A | * | 10/1953 | Goff | 119/81 |
| 3,015,024 | A | * | 12/1961 | Charchan et al. | 362/227 |
| 3,108,400 | A | * | 10/1963 | Wolfe, Jr. | 47/18 |
| 3,357,129 | A | * | 12/1967 | Torrence | 47/79 |
| 4,194,319 | A | * | 3/1980 | Crawford | 47/21.1 |
| 4,223,840 | A | * | 9/1980 | La Scala et al. | 239/207 |
| 4,419,843 | A | * | 12/1983 | Johnson, Sr. | 47/82 |
| 4,770,303 | A | * | 9/1988 | Boyd | 211/205 |
| 5,598,662 | A | | 2/1997 | Droste | |
| 5,806,239 | A | * | 9/1998 | Wesolowski | 47/39 |
| 5,956,893 | A | | 9/1999 | Harrison | |
| 5,974,731 | A | | 11/1999 | Wesolowski | |
| 6,470,625 | B1 | * | 10/2002 | Byun | 47/82 |
| 2002/0029517 | A1 | | 3/2002 | Hutchinson et al. | |
| 2002/0189163 | A1 | | 12/2002 | Cooper | |

* cited by examiner

Primary Examiner—Son T. Nguyen
(74) Attorney, Agent, or Firm—McNair Law Firm, P.A.

(57) ABSTRACT

The apparatus includes a central support conduit having a hollow fluid passageway. A plurality of downwardly arching arms extend radially outward from the central support conduit for carrying a plant container. A mounting sleeve is carried on the central support conduit that includes a plurality of arm brackets for carrying the arms. A fluid distribution hub is carried by the central support conduit and has a chamber in fluid communication with the hollow fluid passageway, and a plurality of fluid diversion conduits extending radially outward from the chamber. A plurality of watering lines, each carrying a valve to control fluid flow through the lines, extend radially outward from the fluid distribution hub. Each watering line has a source end in fluid communication with one of the fluid diversion conduits, and a nozzle end disposed near a distal end of one of the arms for channeling fluid into the plant container.

3 Claims, 3 Drawing Sheets

SELF-WATERING PLANT CARRYING APPARATUS

FIELD OF THE INVENTION

The present invention relates to a support for hanging plants, and more particularly, to a self-watering plant carrying apparatus for supporting plants in an elevated arrangement while enabling the plants to be regularly watered with a selective amount of water flow to prevent over-watering.

BACKGROUND OF THE INVENTION

Hanging plants are often used as landscaping accents that add color and variety to the decor of a home. While hanging plants can be an attractive addition to any landscape, a wilted or dead plant hanging in an especially visible area is a significant detraction. Further, hanging plants are more likely to dry out and wither if not watered on a regular basis, thus requiring considerably more attention than potted plants or plants placed in the ground around the house. As such, the biggest problem with using hanging plants to decorate a house is the difficulty in regularly providing water to the plants, especially in dry and windy climates.

The prior art is replete with various types of plant stands and self-watering mechanisms. Only a relative few of these inventions, however, are directed specifically to hanging plants, as for example the elevated plant watering apparatus disclosed in U.S. Pat. No. 5,974,731. All of these inventions are either overly complex, costly to manufacture, wasteful of water, unsightly, or incapable of hanging more than one plant at a time.

Accordingly, it is an object of the present invention to provide an apparatus for carrying a plurality of plants in an elevated arrangement.

It is another object of the present invention to deliver a supply of water to the suspended plants on a regular basis while avoiding over-watering and the wasteful use of water.

It is another object of the present invention to provide a self-watering plant carrying apparatus that is manufactured in a plurality of parts for ease of storage, transportation, and assembly.

It is another object of the present invention to provide a self-watering plant carrying apparatus that is constructed and arranged in an attractive manner so as to function as a yard ornament, in addition to an apparatus for carrying plants.

SUMMARY OF THE INVENTION

The above objectives are accomplished according to the present invention by providing an apparatus for carrying and watering plants that includes an elongated central support conduit having a lower portion adapted for being placed generally vertically into the ground to support the apparatus in an upright orientation, an upper portion extending upwardly from the lower portion to provide support for carrying plants above the ground, and a hollow fluid passageway for receiving and channeling fluid from the lower portion upward through the upper portion for distribution to plants being carried by the apparatus. A fluid supply connector is provided extending laterally from along the length of the central support conduit in fluid communication with the fluid passageway for connecting to a fluid supply and channeling fluid directly into the fluid passageway. A plurality of downwardly arching arms are provided having a first distal end carried by the upper portion of the central support conduit, and a second distal end extended radially outward from the central support conduit above the ground being adapted for carrying a plant container housing a plant in an elevated arrangement. A fluid distribution hub is carried by the upper portion of the central support conduit being constructed and arranged for receiving fluid from the fluid passageway and channeling the fluid for delivery to the plants carried by the arms. A watering line is carried by each one of the downwardly arching arms extending radially outward from the fluid distribution hub generally along the downward arch of the arm. Each of the watering lines has a source end connected in fluid communication to the fluid distribution hub, and a nozzle end disposed near the second distal end of the arm for channeling fluid into the plant container carried by the arm.

Preferably, a valve is carried by each watering line for separately controlling the flow rate of fluid through each of the watering lines.

In a preferred embodiment, the fluid distribution hub includes a chamber in fluid communication with the fluid passageway, and a plurality of fluid diversion conduits extending radially outward from the chamber in fluid communication with the chamber. The source end of each watering line is connected in fluid communication to one of the fluid diversion conduits for channeling water from the fluid passageway through the watering line to the plant container. A valve interconnects each watering line to one of the fluid diversion conduits in fluid communication for separately controlling the flow rate of fluid out of the fluid passageway and through each watering line to the plants.

Preferably, the downwardly arching arms include a hoop hanger carried by the second distal end being constructed and arranged for carrying a plant container having a complementary hooking member for engaging the hoop hanger.

In a particularly advantageous embodiment, a mounting sleeve is carried circumferentially on the central support conduit having a plurality of arm brackets adapted for receiving and holding the first distal end of the plurality of downwardly arching arms to carry the arms on the central support conduit. The mounting sleeve includes a releasable sleeve securing member for engaging the central support conduit to secure the sleeve at a selected position along the length of the central support conduit, and disengaging to allow the sleeve to slide along the length of the central support conduit to adjust the height of the arms above the ground. Additionally, each of the arm brackets includes a releasable arm securing member for engaging the first distal end of one of the downwardly arching arms to secure the arm to the bracket, and disengaging to allow removal of the arm.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
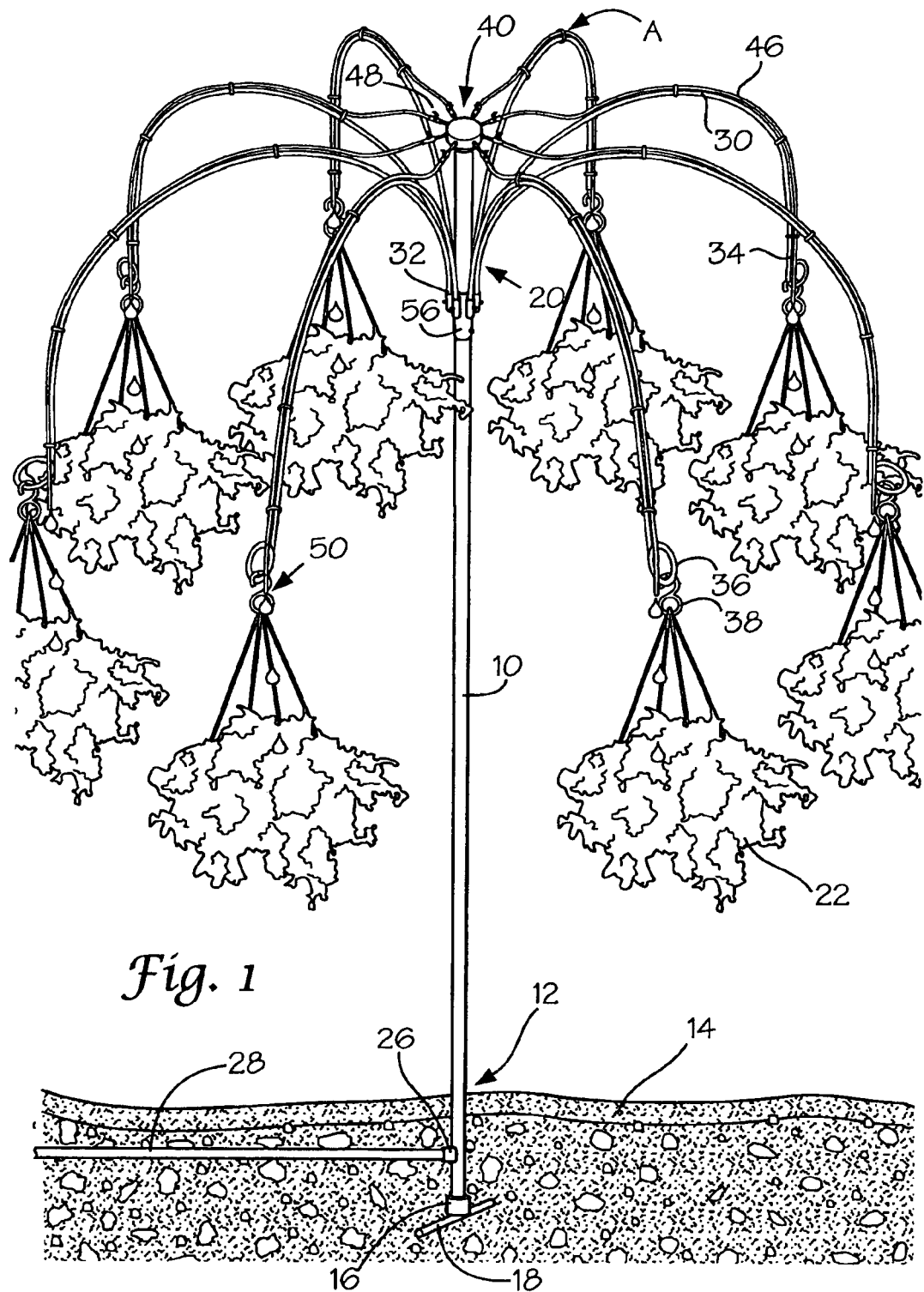
FIG. 1 shows a perspective view of a self-watering plant carrying apparatus according to the invention.

With reference to the drawings, the invention will now be described in more detail. Referring to FIG. 1, a self-watering plant carrying apparatus, designated generally as A, is shown carrying a plurality of plants in an elevated arrangement, while also providing the ability to water the plants.

As best shown in FIG. 1, the apparatus includes an elongated central support conduit 10 having a lower portion, designated generally as 12, adapted for being placed generally vertically into ground 14 to support the apparatus in an upright orientation. Central support conduit 10 further includes an upper portion, designated generally as 20, extending upwardly from said lower portion to provide support for carrying plants 22 above the ground.

Lower portion 12 is adapted by providing a cap 16 carried by the lower distal end of central support conduit 10. The cap is water tight and insures that water is directed upward through central support conduit 10. To help stabilize lower portion 12 in the ground, a stabilizer bar 18 is carried by cap 16 which extends laterally into the ground to provide further support for anchoring central support conduit 10 in the ground. In an alternative embodiment, a flat metal plate may be welded to the distal end of lower portion 12 in place of the cap and stabilizer bar. The metal plate eliminates the need to thread the distal end of lower portion 12 and provide cap 16.

Figure 2:
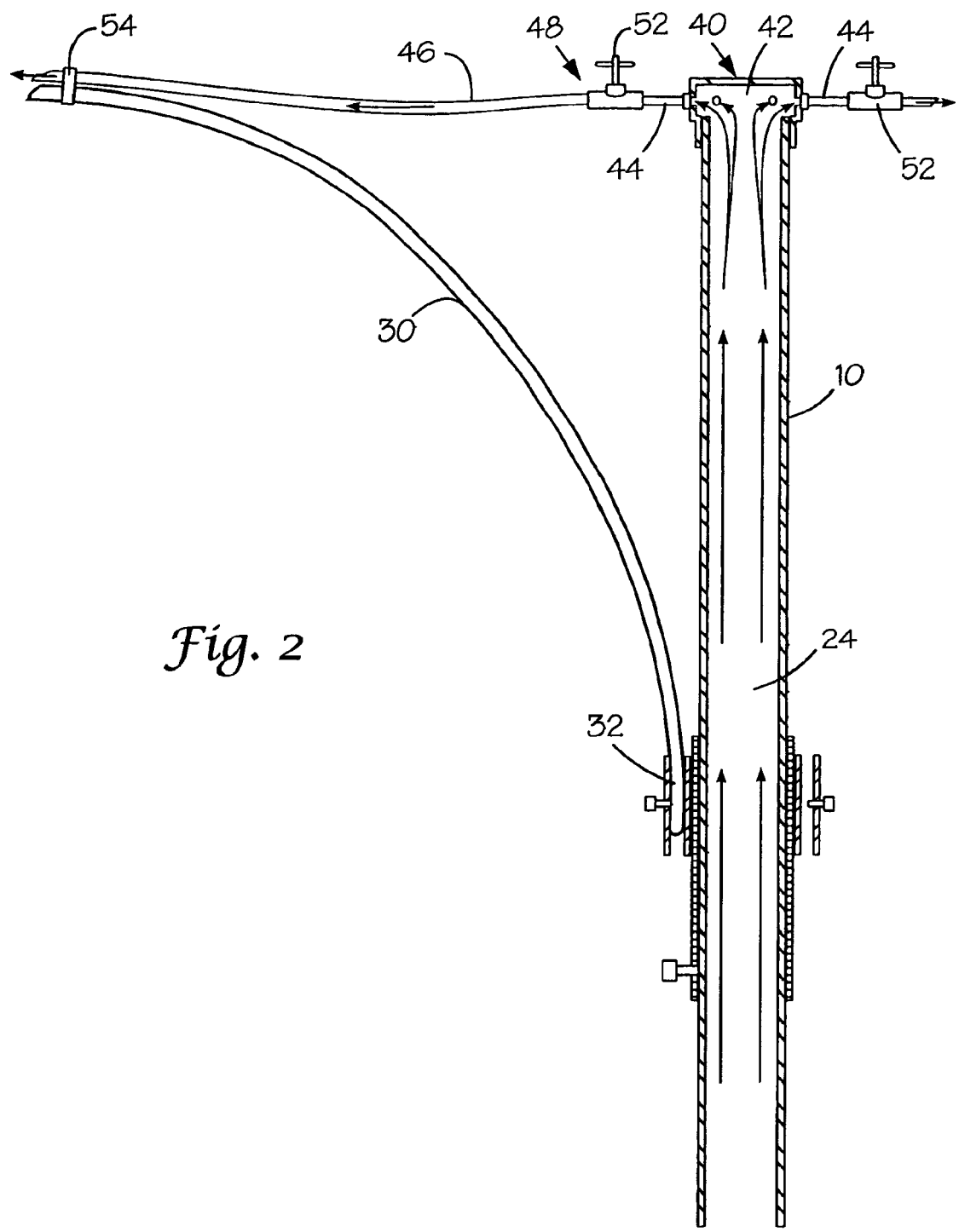
FIG. 2 shows a cross-section view of the hollow fluid passageway and fluid distribution hub according to the invention; and, FIG. 3 shows a detailed perspective view of the mounting sleeve and fluid distribution hub according to the invention.

As best shown in FIG. 2, central support conduit 10 includes a hollow fluid passageway 24 for receiving and channeling fluid from lower portion 12 upward through upper portion 20 for distribution to plants 22 being carried by the apparatus. Referring again to FIG. 1, a fluid supply connector 26 is included in lower portion 12 of central support conduit 10 and extends laterally. Fluid supply connector 26 is in fluid communication with fluid passageway 24. Fluid supply connector 26 is adapted for connecting to a fluid supply represented in FIG. 1 by hose 28 imbedded in ground 14. Fluid supply connector 26 channels the water from the fluid supply directly into fluid passageway 24 so that the water or other fluid will fill fluid passageway 24. While fluid supply connector 26 is shown positioned on lower portion 12 underground, it could alternatively be positioned anywhere along the length of central support conduit 10.

A plurality of downwardly arching arms 30 are carried by central support conduit 10 to carry plants 22. Each of the downwardly arching arms has a first distal end 32 carried by upper portion 20 of central support conduit 10. Each of downwardly arching arms 30 extend radially outward from central support conduit 10 to position a second distal end 34 above the ground. Second distal end 34 is further adapted for carrying a plant container housing plants 22. In a preferred embodiment, second distal end 34 of each of said downwardly arching arms 30 includes a hoop hanger 36 constructed and arranged for carrying a plant container having a complimentary hooking member 38 for engaging hoop hanger 36. As shown in FIG. 1, hooking member 38 suspends the plants in a plant container above the ground and generally beneath second distal end 34 of each of downwardly arching arms 30.

Figure 3:
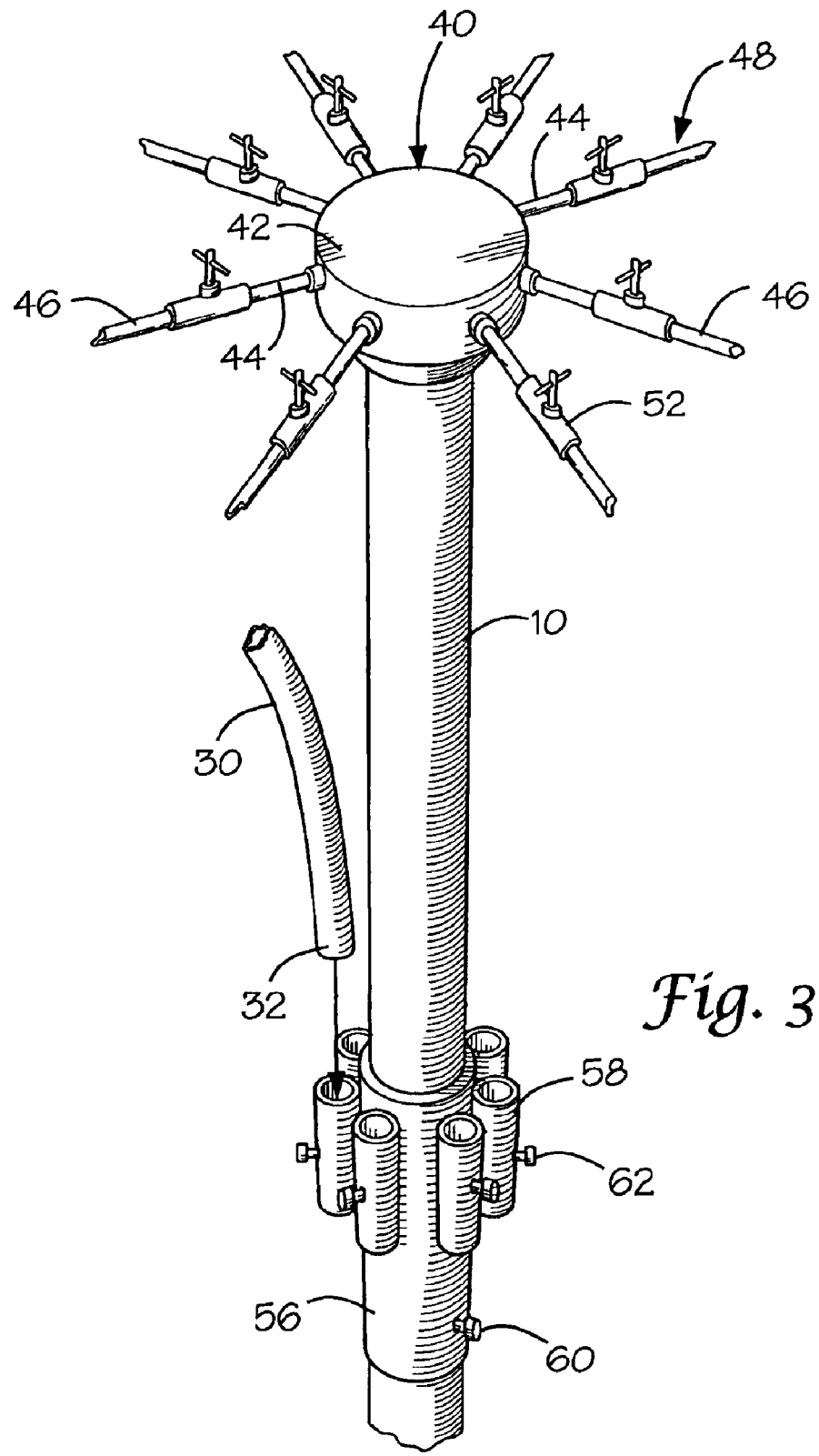

Referring to FIG. 1, a fluid distribution hub, designated generally as 40, is carried by upper portion 20 of central support conduit 10. The fluid distribution hub is constructed and arranged for receiving fluid from fluid passageway 24 and channeling the fluid for delivery to plants 22 carried at second distal end 34 of each of the downwardly arching arms 30. Referring to FIGS. 2 and 3, fluid distribution hub 40 includes a chamber 42 in fluid communication with passageway 24. Additionally, a plurality of fluid outlet control members extend radially outward from said fluid distribution hub. The control members are in fluid communication with chamber 42 and connect to waterlines 46 carried by each of arms 30 for distributing water to the plants at a controlled flow. The fluid outlet control members include fluid diversion conduits 44 extending radially outward from chamber 42 which are in fluid communication with the interior of chamber 42, and valves 52 that connect each of fluid diversion conduits 44 to one of watering lines 46. In this manner, water which enters fluid passageway 24 is directed up through central support conduit 10 to chamber 42 where it is diverted into fluid diversion conduits 44 for distribution to plants 22. Preferably, each of fluid diversion conduits 44 is aligned generally above one of downwardly arching arms 30. Additionally, it is preferred that fluid distribution hub 40 be removably carried by central support conduit 10 to allow for cleaning of chamber 42 and fluid diversion conduits 44 from the inside.

In order to distribute the water flowing into fluid diversion conduits 44, a watering line 46 is carried by each one of downwardly arching arms 30. The watering lines 46 extend radially outward from fluid distribution hub 40 generally along each of the downwardly arching arms 30. Referring to FIGS. 1 and 2, each of watering lines 46 include a source end, designated generally as 48 connected in fluid communication with fluid distribution hub 40. Additionally, each of watering lines 46 include a nozzle end, designated generally as 50, disposed near second distal end 34 of each of downwardly arching arms 30 for channeling fluid into the plant containers carried by the arms. Preferably, a valve 52 is carried by each of watering lines 46 for separately controlling the flow rate of fluid through each of the watering lines for distribution to plants 22. In a particularly preferred embodiment as best shown in FIGS. 2 and 3, source end 48 of each watering lines 46 is connected in fluid communication to one of fluid diversion conduits 44 for channeling water from fluid passageway 24 through the watering lines to plants 22. In this arrangement, it is preferred that valve 52 interconnects each of watering lines 46 to one of fluid diversion conduits 44 in fluid communication for separately controlling the flow rate of fluid out of fluid passageway 24 and through each of watering lines 46 to the plants 22. As best shown in FIG. 2, zip ties 54 or other securing members may be used to attach watering lines 46 to downwardly arching arms 30 so that the watering line runs along the arm to deliver the fluid directly above plants 22, which are carried at second distal end 34 of the arms.

Referring to FIGS. 1 and 3, the apparatus includes a mounting sleeve 56 carried circumferentially on central support conduit 10. Mounting sleeve 56 includes a plurality of arm brackets 58 adapted for receiving and holding first distal end 32 of each of said downwardly arching arms 30 to carry the arms on central support conduit 10. As best shown in FIG. 3, mounting sleeve 56 includes a releasable sleeve securing member 60 for engaging central support conduit 10 to secure the sleeve at a selected position along the length of central support conduit 10. Releasable sleeve securing member 60 can be disengaged to allow the sleeve to be repositioned by sliding the sleeve along the length of central support conduit 10 to adjust the height of the arms above the ground. Additionally, in a preferred embodiment, each of arm brackets 58 include a releasable arm securing member 62 for engaging first distal end 32 of each of arms 30 to secure the arms in the bracket. Releasable arm securing member 62 can then be disengaged to allow removal of the arm. This allows for ease of storage, transportation and assembly.

While a preferred embodiment of the invention has been described using specific terms, such description is for illustrative purposes only, and it is to be understood that changes and variations may be made without departing from the spirit or scope of the following claims.

What is claimed is:

1. A plant carrying and watering apparatus comprising:

an elongated central support conduit having a central fluid passageway for receiving water from a ground water supply and channeling said water upward through said central support conduit;

a plurality of arms adapted for carrying plants;

a mounting sleeve arranged circumferentially around an exterior of said central support conduit carrying said plurality of arms for vertical movement adjusting the height of said arms along said central support conduit;

a fluid distribution hub carried atop said central support conduit having a chamber in fluid communication with said central fluid passageway for receiving and storing said water; and, a plurality of fluid outlet control members extending radially outward from said fluid distribution hub connecting to waterlines carried by each of said arms for separately and selectively controlling the distribution of said water through each of said waterlines to said plants;

whereby said arms may be adjusted vertically relative to said central support conduit and said water may be delivered to each of said plants at an individually selected rate of flow.

2. The apparatus of claim 1 wherein said plurality of fluid outlet control members includes a fluid diversion conduit in fluid communication with said chamber, and a valve carried by said fluid diversion conduit connecting said fluid diversion conduit with one of said waterlines.

3. The apparatus of claim 1 wherein said mounting sleeve includes a plurality of arm brackets having a releasable arm securing member for engaging a first distal end of one of said arms to secure the arm in said bracket, and said securing member disengaging to allow removal of said arm.

* * * * *